March 6, 1951     G. H. BUNCH     2,543,888
ROTARY FERTILIZER INJECTOR

Filed March 12, 1948     2 Sheets-Sheet 1

INVENTOR.
GEORGE H. BUNCH
BY McMorrow, Berman & Davidson
ATTORNEYS

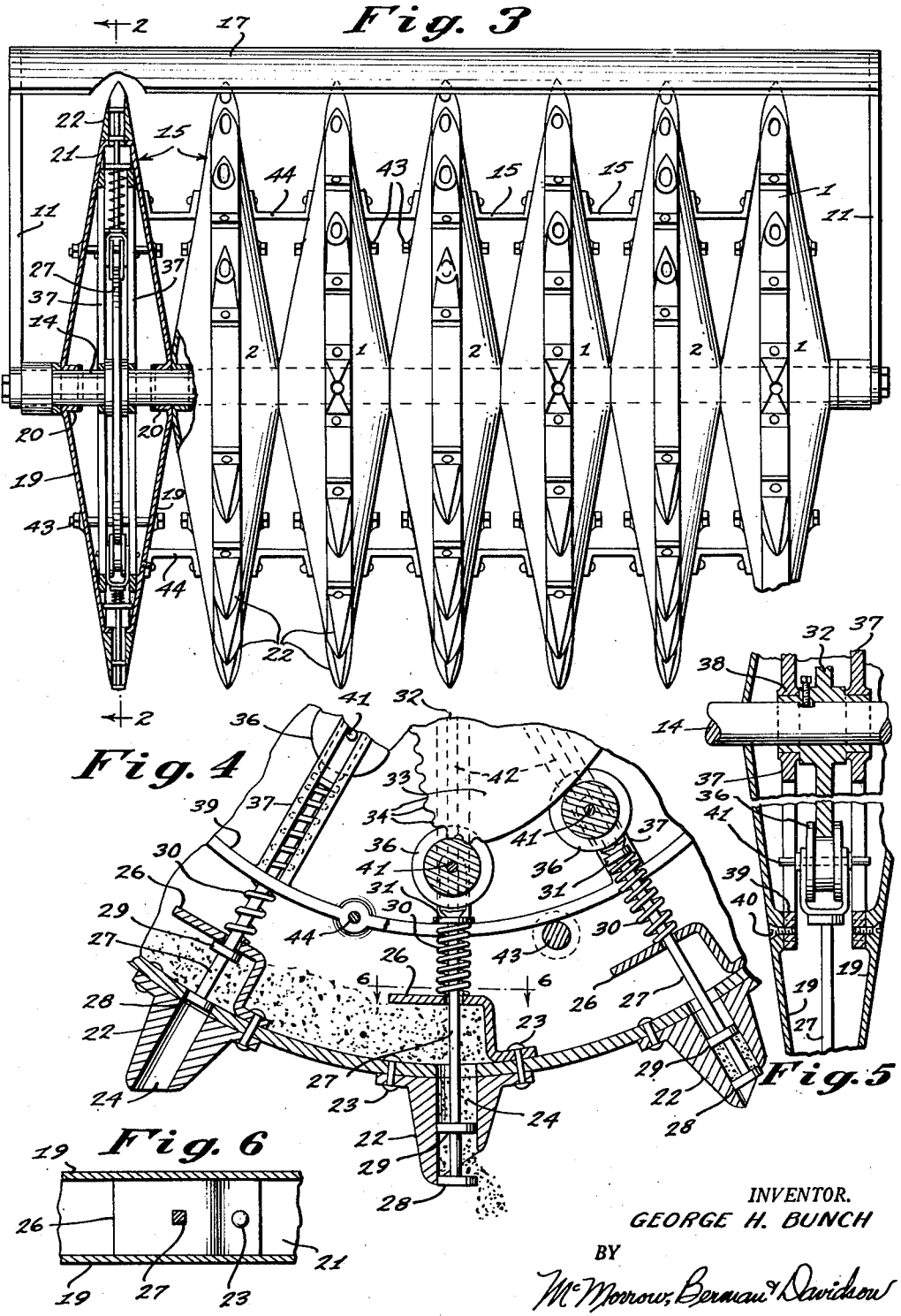

Patented Mar. 6, 1951

2,543,888

UNITED STATES PATENT OFFICE 2,543,888

ROTARY FERTILIZER INJECTOR

George H. Bunch, Statesville, N. C.

Application March 12, 1948, Serial No. 14,555

2 Claims. (Cl. 111—91)

This invention relates to improvements in fertilizer distributor devices, and more particularly to an improved device for injecting fertilizer into the ground.

It is among the objects of the present invention to provide an improved fertilizer distributor that is effective to deposit predetermined quantities of fertilizer at predetermined spaced intervals a predetermined distance below the surface of the ground, which device is automatically operative upon being pulled over the ground to be fertilized and may be pulled either by tractor or by draft animals, as may be desired, is not subject to choking or clogging or other unsatisfactory performance in use, is simple, durable and economical in construction, carries a large quantity of fertilizer to avoid the necessity of frequent refilling while in use, and is easily transported.

Other objects and advantages will become apparent from a consideration of the following description in conjunction with the accompanying drawings, wherein:

Figure 3 is a rear elevation of the device illustrated in Figure 1, a portion being broken away and shown in cross-section to better illustrate the construction thereof;

Figure 4 is a transverse cross-section on an enlarged scale of a fragmentary portion of the device, particularly illustrating the means for forcing measured quantities of fertilizer into the ground through pointed hoes having bores extending therethrough;

Figure 5 is a cross-section on an enlarged scale of a fragmentary portion of one of the wheel units of the device; and Figure 6 is a cross-section of a fragmentary portion of one of the wheel units and is taken substantially in the plane of the section line 6—6 of Figure 4.

Figure 1:
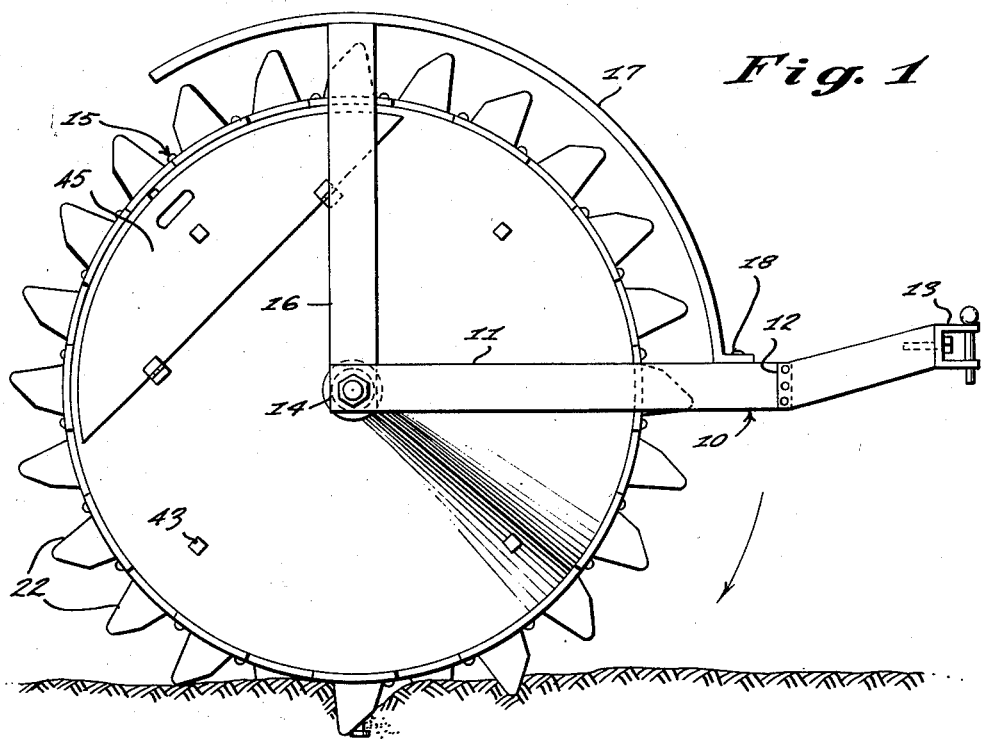
Figure 1 is an end elevation of a fertilizer-distributing device illustrative of the invention.
Figure 2:
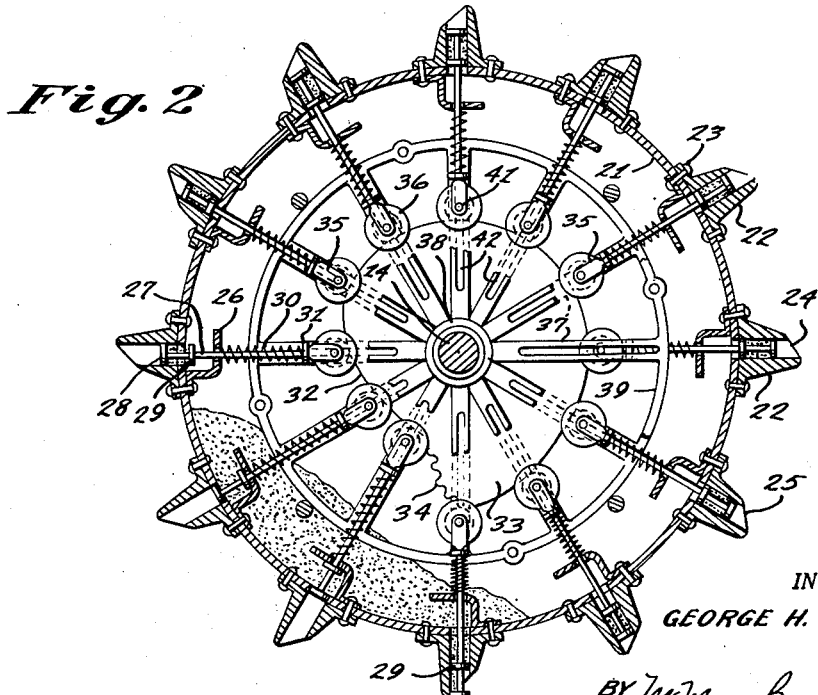
Figure 2 is a transverse cross-section of the device illustrated in Figure 1, taken substantially in the plane of the section line 2—2 of Figure 3.

In the cultivation of certain crops, and particularly in the cultivation of fruit trees planted in soft or loose soil, it has been found desirable to apply fertilizer to the trees at a considerable distance below the surface of the ground in which the trees are planted in order to prevent the feeder roots of the trees from coming to the surface of the ground where they would be injured by drought or cultivation, and to avoid shock to the trees as frequently happens when heavy fertilization is applied to surface feeder roots. It is also desirable to fertilize the trees at frequent intervals without destroying or materially damaging any cover crop that may be growing between the tree rows at the time. The device of the present invention accomplishes these results by depositing measured, predetermined quantities of fertilizer at a predetermined depth below the surface of the ground and at spaced intervals such as to provide the proper fertilization. The fertilizer so deposited will remain in the ground for a considerable period and is slowly dissolved and taken up by the roots of the trees.

In the device illustrated, a U-shaped frame, generally indicated at 10 and comprising a pair of legs or side members 11 and a front bar or intermediate member 12, has a towing hitch 13 secured to the front end thereof overlying the front bar 12. While the towing hitch illustrated is for the purpose of attaching the device to a conventional farm tractor, it is to be understood that a tongue may be substituted for the towing hitch without in any way exceeding the scope of the invention. The rear ends of the frame legs 11 are apertured and receive the ends of an axle 14 which extends transversely of the frame. The axle is secured at its ends to the frame in a manner to preclude rotation of the axle relative to the frame, and a plurality of wheel units, generally indicated at 15, are journaled on the axle 14 in side-by-side relationship.

A pair of struts 16 extend upwardly, one from each end of the axle 14, and support at their upper ends the rear portion of a partly cylindrical cover or shield 17, the front end of which is secured to the frame 10, as indicated at 18, and which overlies the upper forward portions of the wheels 15.

Each of the wheel units comprises a pair of spaced-apart, opposed walls 19 of dished or flat conical shape so arranged that the wheel is materially thicker at its center than at its periphery. These walls 19 are provided with central apertures for the axle 14 and with apertures surrounding internal flanges 20 which provide bearings which journal the wheels on the axle. At their outer edges the walls 19 are flanged inwardly to provide a tire or tread 21 and a plurality of pointed hoes 22 are secured to this tire 21 by suitable means, such as rivets 23, extending through apertures in the base flange of each hoe and through corresponding apertures in the tire 21.

Each hoe 22 is preferably of rectangular cross-sectional shape and somewhat pyramidal in form and has a cylindrical bore 24 extending longitudinally therethrough. The pointed outer end of each hoe 22 is beveled, as indicated at 25, across the outer end of the bore 24 so that the hoe is materially longer at the rearward side of the bore than at the forward side thereof. The tire portion 21 of the wheel is provided with apertures registering with the bores 24 of the hoes 22 and the hoes are disposed at predetermined, preferably uniform, intervals around the periphery of the wheel. The number of hoes applied to each wheel and the spacing therebetween may be varied without in any way exceeding the scope of the invention.

A respective flanged scoop 26 overlies each tire aperture opposite a corresponding bore 24, these scoops preferably being secured in operative position by the rivets 23 that secure the hoes to the wheel. Each scoop 26 is provided with an aperture opposite the corresponding aperture in the wheel tire and slidably receives a respective plunger 27, the outer end of which extends into the bore of the corresponding hoe 22. A pair of spaced-apart pistons 28 and 29 are fixed on the outer end of each plunger 27 and are slidably received in the bore of the corresponding hoe, the numeral 28 indicating the outer piston, and 29 the inner piston in the arrangement illustrated. A coiled compressed spring 30 surrounds each plunger 27 and bears at its outer end against the corresponding scoop 26, and at its inner end against a washer abutment 31 secured on the plunger adjacent the inner end thereof. Each of these springs acts to resiliently urge its corresponding plunger inwardly of the wheel. The plungers are forced outwardly of the wheel as the corresponding hoes are successively brought into ground-penetrating position at the bottom of the wheel by a cam 32 secured to axle 14 within the wheel and operatively engaging the inner ends of the plungers. Cam 32 is substantially circular for the greater part of its extent, but has a downwardly-extending lobe 33, the forward face of which is toothed or serrated, as indicated at 34. The extent of the lobe 33 is such as to force each plunger 27 outwardly as the corresponding hoe 22 reaches the bottom of the wheel to a position at which the inner piston 29 is just within the shorter side of the corresponding bore, the space between the pistons 28 and 29 being open so that fertilizer carried between these pistons to the outer end of the corresponding hoe will be deposited in the ground at the location at which the hoe penetrates the ground, as is clearly illustrated in Figure 1.

A respective fork 35 is secured on the inner end of each plunger 27 and a grooved roller 36 is journaled in the inner end of each fork 35 and bears against the edge of cam 33, so that the plungers will be forced outwardly against the springs 30 as the wheel is rotated about the cam. The teeth or serrations 34 on the cam serve to vibrate the plungers 27 when the corresponding rollers pass over these serrations to prevent the coating of the plungers with fertilizer and the accumulation of fertilizer in a manner to choke or clog the device. The vibrating action of the serrations covers the period of loading and unloading the space between the two pistons on each plunger so that the loading of these spaces with fertilizer and the discharge of fertilizer therefrom is facilitated by the vibrating action of the serrations on the corresponding rollers 36 and the associated plungers.

The scoops 26 open rearwardly in the wheel, and, as the wheel is rotated, fertilizer in the wheel falls into these scoops maintaining the scoops full of fertilizer, which fertilizer is constantly supplied to the space between the two plunger pistons 28 and 29 to be forced out of the wheel through the corresponding bores of the hoes 22 as the hoes are successively brought to their ground-penetrating position at the bottom of the wheel. As the space within the corresponding bore between the two plunger pistons is constant, a predetermined amount of fertilizer will be injected into the ground at each operation. The hoes 22 have a sufficient length to deposit the fertilizer at the desired position below the surface of the ground, a distance of from six to eight inches being considered particularly desirable.

The plungers 27 are guided in their reciprocatory movements in the wheel by suitable guide means including corresponding pairs of longitudinally-slotted spoke elements 37 with the two spoke elements of each pair disposed one at each side of the corresponding plunger 27, as is clearly illustrated in Figure 3. These elements are secured at their inner ends to corresponding rings 38, which are journaled on the axle 14, and at their outer ends to corresponding outer rings 39 secured one to each side wall 19 of the wheel by suitable means, such as the screws 40. The axle pins 41, by means of which rollers 36 are journaled in forks 35, extend outwardly at their ends and are received in the longitudinal slots 42 of the corresponding spoke guide elements 37, so that the inner ends of the plungers are firmly guided for movement toward and away from the axle 14 by operation of the cam 33 and springs 30.

The two walls of each wheel are secured together by suitable means, such as the through bolts 43 and adjacent wheels are secured together by interconnecting brackets 44 so that all of the wheels rotate as a single unit. The hoes on adjacent wheels are preferably staggered relative to each other, as is clearly illustrated in Figure 3, for a more desirable spacing of the fertilizer deposits in the ground.

There is thus provided a device which will automatically deposit predetermined quantities of fertilizer in the ground at uniformly spaced positions and at a predetermined depth below the surface of the ground. Each hollow wheel 15 will hold a large quantity of fertilizer which is put into the wheel through a fertilizer door 45 provided in one side wall of each door, and the scoops 26 will insure an equal distribution of the fertilizer to the various hoes 22.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. In a fertilizer distributor having a frame, an axle fixed in said frame, and a hollow wheel journalled on said axle and constituting a fertilizer container, feed means for injecting measured quantities of fertilizer from the wheel into the ground comprising a plurality of hoes on the periphery of said wheel projecting radially outward from such periphery at substantially equal angular intervals therearound, each of said hoes having a bore extending longitudinally therethrough and communicating with the interior of said wheel, a cam fixed on said axle within said wheel and having a downwardly extending lobe, a plunger extending from each hoe inwardly towards said cam, a cam-following roller on the inner end of each plunger, an outer piston on the outer end of each plunger slidable in the bore of the respective hoes, an inner piston on each plunger spaced inwardly of the corresponding outer piston a distance less than the length of the bore of the corresponding hoe, a spring connected between each plunger and the wheel for maintaining the associated cam-following roller in contact with the cam, said cam having a throw such as to move each outer piston substantially from one end to the other end of the bore of the corresponding hoe as the wheel rotates about the axle, to force a measured quantity of fertilizer out of each hoe as the hoes successively reach the rotational position directly below the lobe of said cam, and a plurality of scoops in said wheel attached to the peripheral portion of the latter and respectively overlying the inner ends of the bores of said hoes to direct fertilizer between the corresponding pairs of outer and inner pistons, said cam having serrations along one side of the lobe thereof to successively vibrate said plungers.

2. In a distributor for injecting material into the ground, an axle, a hollow wheel journalled on said axle and constituting a container for such material, feed means for injecting measured quantities of the contents of said wheel into the ground comprising a plurality of hollow hoes projecting radially from the periphery of said wheel at angular intervals therearound and communicating interiorly with the interior of said wheel, a cam fixed to said axle within said wheel and having a downwardly extending lobe, plungers extending one from each hoe inwardly of said wheel toward said cam, cam followers carried one on each plunger at the inner end thereof, springs disposed between said wheel and said plungers maintaining said cam followers in contact with said cam, and means on said plungers at the outer ends thereof for moving measured quantities of the contents of said wheel outwardly through said hoes as said plungers are moved outwardly of said hoes by said cam lobe, said cam having serrations on the forward side of said lobe in the direction of movement of said rollers about said cam for vibrating said plungers.

GEORGE H. BUNCH.

REFERENCES CITED

The following references are of record in the file of this patent:

UNITED STATES PATENTS

| Number | Name | Date |
|---|---|---|
| 16,772 | Myers | Mar. 3, 1857 |
| 331,885 | Hunter | Dec. 8, 1885 |
| 455,290 | Normand | June 30, 1891 |
| 772,329 | Arnold | Oct. 18, 1904 |
| 2,097,887 | Lacey | Nov. 2, 1937 |
| 2,151,414 | Beemer | Mar. 21, 1939 |

FOREIGN PATENTS

| Number | Country | Date |
|---|---|---|
| 10,525 | Great Britain | Feb. 20, 1845 |
| 84,417 | Austria | June 25, 1921 |
| 101,052 | Austria | Sept. 25, 1925 |